(No Model.) 3 Sheets—Sheet 1.
H. G. KEASBEY.
MACHINE FOR MOLDING TUBES OR CYLINDERS.
No. 397,860. Patented Feb. 12, 1889.
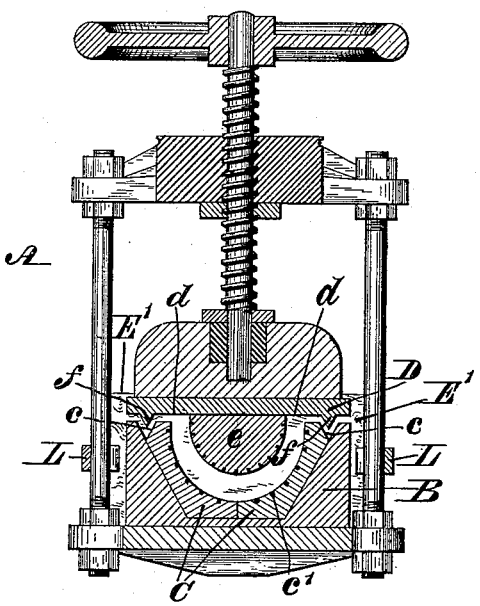

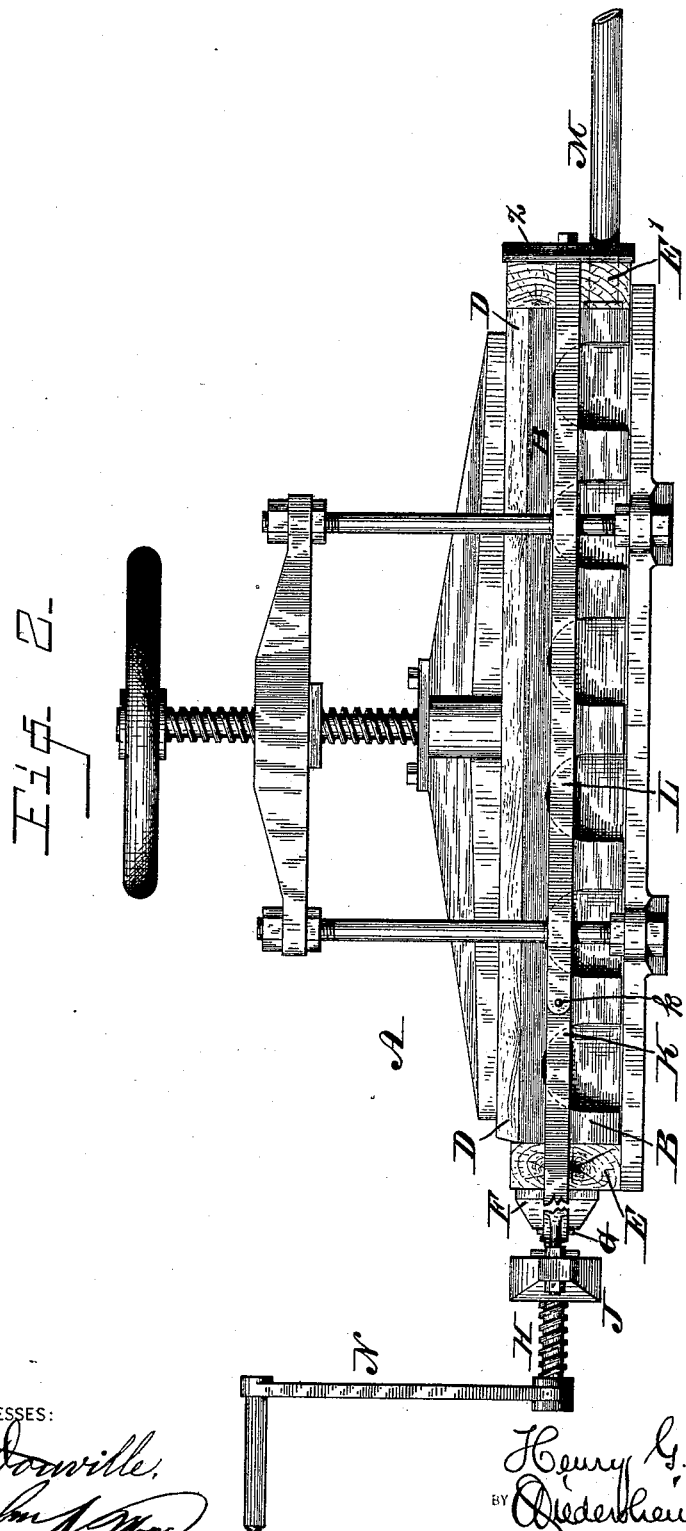

(No Model.) 3 Sheets—Sheet 3.
H. G. KEASBEY.
MACHINE FOR MOLDING TUBES OR CYLINDERS.
No. 397,860. Patented Feb. 12, 1889.
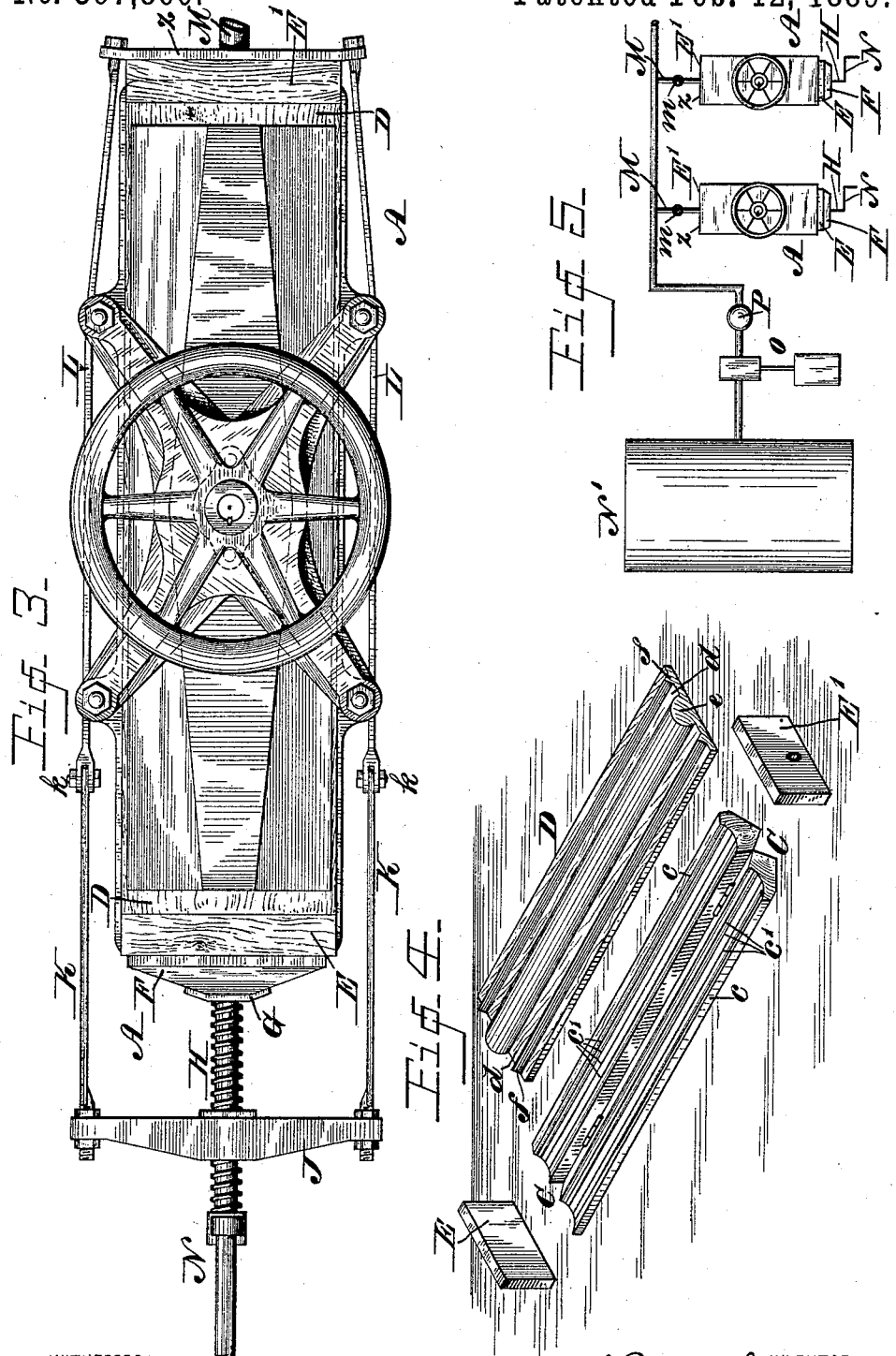
WITNESSES:
L. Nouville
INVENTOR:
Henry G. Keasbey
BY Wiederheim & Kritner
ATTORNEYS.

UNITED STATES PATENT OFFICE.

HENRY G. KEASBEY, OF AMBLER, ASSIGNOR OF ONE-HALF TO RICHARD V. MATTISON, OF PHILADELPHIA, PENNSYLVANIA.

MACHINE FOR MOLDING TUBES OR CYLINDERS.

SPECIFICATION forming part of Letters Patent No. 397,860, dated February 12, 1889.

Application filed February 29, 1888. Serial No. 265,741. (No model.)

*To all whom it may concern:*

Be it known that I, HENRY G. KEASBEY, a citizen of the United States, residing at Ambler, in the county of Montgomery, State of Pennsylvania, have invented a new and useful Improvement in Machines for Molding Tubes or Cylinders, which improvement is fully set forth in the following specification and accompanying drawings.

My invention has for its object the production of an apparatus or machine for forming or molding tubes or cylinders of plastic material, such as are employed for covering steam and like pipes, by which the tubes or cylinders are formed perfectly, rapidly, and cheaply.

To attain the desired objects the invention consists, first, in a peculiar construction of mold for forming the tube; second, in a press of suitable construction for containing the mold; third, in an improved apparatus for feeding the material to the mold, and, finally, in the novel construction, arrangement, and adaptation of parts, all as hereinafter described and claimed.

Figure 1 represents a vertical sectional view of a press and mold embodying my invention. Fig. 2 represents a side elevation thereof. Fig. 3 represents a top or plan view thereof. Fig. 4 represents a view of the parts comprising the mold and the end or head and tail pieces. Fig. 5 is a top or plan view of the complete apparatus or machine.

Similar letters of reference indicate corresponding parts in the several figures.

Referring to the drawings, A designates a hand-press of the well-known and usual or of any preferred construction in connection with which I employ my apparatus.

Resting on the bed-plate of the press is a metal case or box, B, as clearly shown in Fig. 1. This case has its inner walls inclined, or, in other words, is substantially hexagonal in cross-section.

C designates the bottom portion of the mold, which may be constructed of wood, metal, or other suitable material, and may, if desired, for convenience in constructing, be formed in two parts or sections hinged together, as shown in Fig. 4. This bottom portion of the mold is hexagonal on its outer surface, to allow it to rest or fit snugly in the case or box B, and cut out at $c$ for the purpose to be explained. The inner face of the bottom portion is curved or semicircular, and has grooves or channels $c'$ extending longitudinally over its surface, the purpose of which is to drain the liquid from the material which forms the pipes or tubes.

D designates the top portion of the mold, which is carried by the follower of the press, and comprises the flat portion $d$, the depending, curved, or semicircular ridge or portion $e$, and the inclined projections $f$. This portion may also be provided with the longitudinal grooves or channels before mentioned. Both the top and bottom portion or core and body thereof are covered with muslin or like material. From this construction it will be observed that the top and bottom of the mold, when fitted together, provide a half or semicircular space, and in this space the material to form the pipes, tubes, or cylinders is placed.

E and E′ designate, respectively, the head and tail pieces. To the head-piece E is secured a plate, F, provided with a socket, G, to receive one end of a screw, H. This screw also passes through a bar, J, and at its outer end has a lever, wheel, or crank, N. The said bar J has secured or connected to its ends rods or arms K, which rods or arms are hinged, jointed, or pivoted at $k$ to long arms L. From this construction it is evident that the head-piece can be pressed firmly into contact with the mold by means of the screw, or be swung out of the way to permit the mold to be withdrawn from the press. The ends of the arms or rods L are connected to a plate, $z$, secured to the tail-piece E′. Passing through the tail-piece E′, and having its open end adjacent to the mold, is a feed or supply pipe, M. This supply or feed pipe, provided with a cock or check, $m$, leads from a reservoir, N′, and has a feed-pump, O, and air-chamber P, provided with a pressure-gage situated at a proper point of its length, all as clearly shown in Fig. 5 of the drawings.

This being the construction of the apparatus, the consequent operation is as follows: The mold is placed in the press, and the head and tail pieces tightly close the ends of the mold, and the projections fit snugly in the recess formed between the cut-out portion of the lower section of the mold and the surrounding case or box B. The cock on the feed-pipe is opened and the material for forming the mold is forced from the reservoir by means of the pump through the feed-pipe to the mold, and when the proper amount is supplied to the mold the cock is closed. The liquid is drained from the material and the mold is removed and emptied. The air-chamber, which contains air under pressure, acts as a cushion to prevent shock and pressure on the mold.

It is evident that a number of the presses containing the mold can be fed from a common or single reservoir, or that more than one mold can be placed in a press.

I have shown and described my invention for making half cylinders or tubes; but I would have it understood that the same is applicable to the construction of an entire tube.

It will be observed that an apparatus constructed as described will produce or make tubes, pipes, or cylinders of the character described cheaply, rapidly, and perfectly.

Having thus described my invention, what I claim as new, and desire to secure by Letters Patent, is—

1. A machine or apparatus for making plastic tubes, having a press with a mold therein, a reservoir, a supply-pipe leading from said reservoir to said mold, a pumping device for forcing tube material from the said reservoir to said mold, and an air-chamber communicating with said supply-pipe and between the pumping device and the mold, said parts being combined substantially as described.

2. A press with a mold therein, a tail-piece with arms secured thereto, bars pivoted to said arms, a cross-bar secured to said bars, a head-piece with a plate having a socket, and a screw passing through the cross-bar and working in said socket, said parts being combined substantially as described.

3. In a machine for making plastic tubes, the combination, with the press having the mold arranged in a case therein, of the head and tail pieces closing the ends of the mold, the head-piece being capable of a swinging movement, substantially as and for the purpose described.

4. In an apparatus for making plastic tubes, a mold consisting of an upper or top portion having the flat part $d$, the depending curved ridge $e$, and the inclined projection $f$, and a bottom portion with a curved inner face and cut-out portion $c$, said parts combined substantially as and for the purpose set forth.

5. In a machine for making plastic tubes, pipes, or cylinders, the press containing the mold, and the head and tail pieces connected together for closing the ends of the mold, in combination with the feed-pipe provided with a cock or check for supplying material to the mold, substantially as described.

6. In a machine or apparatus for making plastic tubes, the combination, with the press containing the mold, of the head and tail pieces connected together and closing the ends of the mold, devices in the head-piece for pressing the head and tail pieces firmly against the ends of the molds, and an opening in the tail-piece to receive the feed or supply pipe, substantially as and for the purpose described.

7. In a machine for making plastic tubes, the mold comprising the upper and lower part, said lower part being hinged and both provided with longitudinal grooves or channels, substantially as described.

HENRY G. KEASBEY.

Witnesses:
WM. N. MOORE,
A. P. JENNINGS.